(12) United States Patent
Spangler, Jr. et al.

(10) Patent No.: US 7,056,400 B1
(45) Date of Patent: Jun. 6, 2006

(54) METHOD OF SEPARATING SUPERALLOY METAL POWDER FROM ADMIXED CONTAMINANTS

(75) Inventors: Charles E. Spangler, Jr., Harrison City, PA (US); Frederick Carl Schwerer, III, Export, PA (US); William J. Murphy, Pittsburgh, PA (US)

(73) Assignee: R. J. Lee Group, Inc., Monroeville, PA (US)

( * ) Notice: Subject to any disclaimer, the term of this patent is extended or adjusted under 35 U.S.C. 154(b) by 392 days.

(21) Appl. No.: 10/420,126

(22) Filed: Apr. 22, 2003

(51) Int. Cl.
*C22F 1/10* (2006.01)

(52) U.S. Cl. .................. 148/676; 148/674; 210/222; 210/758; 210/774

(58) Field of Classification Search ............. 148/674, 148/676; 210/758, 774, 222
See application file for complete search history.

(56) References Cited

U.S. PATENT DOCUMENTS

| | | | |
|---|---|---|---|
| 1,811,032 A | 6/1931 | Smith | |
| 3,516,612 A | 6/1970 | Fullman | |
| 3,544,309 A * | 12/1970 | Derry et al. ............. | 75/430 |
| 3,926,789 A | 12/1975 | Shubert | |
| 3,953,252 A | 4/1976 | Levin et al. | |
| 3,960,617 A | 6/1976 | Levin et al. | |
| 4,054,513 A * | 10/1977 | Windle ..................... | 209/214 |
| RE30,360 E | 8/1980 | Shubert | |
| 4,230,750 A * | 10/1980 | Yurasko, Jr. ............. | 427/451 |
| 4,259,296 A * | 3/1981 | Hennion et al. .......... | 423/53 |
| 4,312,684 A | 1/1982 | Chraplyvy et al. | |
| 4,318,735 A | 3/1982 | Mishima et al. | |
| 4,318,757 A | 3/1982 | Horimoto et al. | |
| 4,347,086 A | 8/1982 | Chraplyvy et al. | |
| 4,377,410 A * | 3/1983 | Thomas et al. ........... | 75/419 |
| 4,608,093 A | 8/1986 | Umemura et al. | |
| 4,909,865 A | 3/1990 | Nakagawa et al. | |
| 5,062,904 A | 11/1991 | Yoden | |
| 5,749,939 A * | 5/1998 | Kundrat ..................... | 75/560 |
| 6,447,571 B1 * | 9/2002 | Ito et al. ................... | 75/255 |
| 2002/0144753 A1 | 10/2002 | Yoshimura et al. | |

* cited by examiner

*Primary Examiner*—John P. Sheehan
(74) *Attorney, Agent, or Firm*—Arnold B. Silverman; Eckert Seamans Cherin & Mellott, LLC

(57) ABSTRACT

A method is provided for separating superalloy metal powder from contaminants, such as process-produced contaminants, by enhancing the magnetic properties thereof, such as by oxidizing or leaching of chromium, for example, followed by magnetic separation of the contaminants from the superalloy metal powder to thereby enhance the concentration of the contaminants. Heating conditions or mechanical agitation or both are employed to resist agglomeration of the metal powder before magnetic separation thereof from the contaminants. Certain preferred times and temperatures are disclosed.

34 Claims, 1 Drawing Sheet

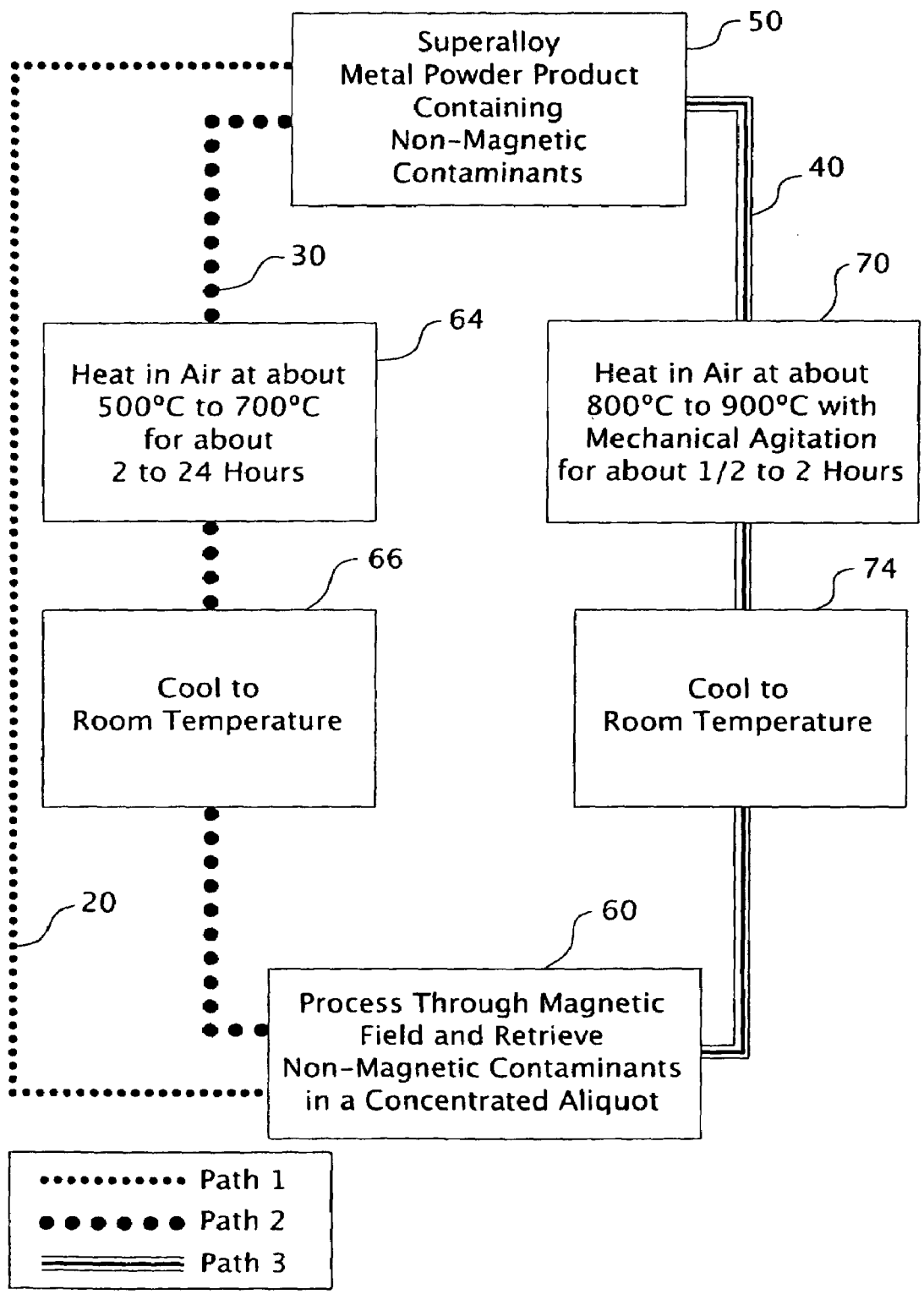

METHOD OF SEPARATING SUPERALLOY METAL POWDER FROM ADMIXED CONTAMINANTS

BACKGROUND OF THE INVENTION

1. Field of the Invention

The present invention relates to an improved, safe and reliable method of separating a superalloy metal powder from contaminants such as process-produced produced contaminants.

2. Description of the Prior Art

It has been known in connection with powder metal product manufacture to monitor and separate contaminants therefrom in order to produce higher quality products from the metal powder. It has also been known to employ quality assurance methods wherein it is desired to detect and characterize process-produced contaminants for superalloy metal powders as a means for enhancing the quality of product made therefrom particularly in products wherein the consequences of failure are particularly serious.

It has been known to detect and characterize the concentration of process-produced contaminants by first concentrating the processed-produced contaminants by heavy liquid separation processes, such as those employing thallium malinate formate, into an aliquot which was subsequently examined by microscopy methods. This process separates the metal powder which may have a density of about 8.0 grams/cm$^2$ from oxides which may have a density of about 4.0 grams/cm$^2$ or less as a result of the density differences. It is also desired in such processes to increase the volume of the processed powder metal sample in order to improve the statistical reliability of the microscopy methods.

A serious problem with the use of thallium malinate formate is that it is potentially hazardous. It requires the services of specially-trained technicians as well as continuous monitoring of the technicians' exposure levels, special laboratory handling equipment and special disposal methods. Further, it has a limited batch size and a process time of about one batch per eight-hour shift. The small batch size limits the accuracy of the quality assurance analysis for detecting process-produced contaminant particles. Further, these negative factors contribute directly or indirectly to increased overall costs of the quality assurance process.

It has been suggested to employ two-stage oxidation of the surface of metal particles which consists mainly of iron and an oxidation environment at an elevated temperature in order to enhance stability of the metal particles. See, for example, U.S. Pat. No. 4,318,735. See also U.S. Pat. No. 4,608,093 which discloses gradual oxidation of ferromagnetic particles in order to create a stable oxide coating that will resist deterioration under the influence of temperature and humidity. The heating is said to occur in two stages at temperatures up to 150° C.

U.S. Pat. No. 4,909,865 discloses a ferromagnetic metal powder composed mainly of iron which is provided with an oxide coating for uses in magnetic recording media.

U.S. Pat. No. 5,062,904 discloses the processing of ferromagnetic particles which are said to be provided with enhanced storage stability through oxidation of the surface under the influence of plasma in an oxygen atmosphere.

U.S. Patent Publication 2002/0144753 discloses a method of producing a rare earth metal-based permanent magnet having a thin film layer through placing the rare earth permanent magnet and a fine metal powder forming material into a treating vessel and vibrating them and agitating them.

U.S. Pat. No. 3,516,612 discloses the resistance to forming of clumps or aggregates in fine particles for a magnetic material due to a combination of an imposed magnetic field and mechanical agitation such as, by mechanical brushing of the powder.

In spite of the foregoing disclosures, there remains a very real and substantial need for a reliable safe and accurate method for separating superalloy metal powder particles from contaminants, such as process-produced contaminants.

Overall as a result of the foregoing limitations, there exists a very real and substantial need for a reliable, safe, accurate and lower-cost method for producing aliquots from the superalloy metal powder particles which are concentrated with respect to contaminants, such as process-produced contaminants, and which are amenable to microscopy analysis for statistically reliable quality assurance.

SUMMARY OF THE INVENTION

The present invention has met the hereinbefore described needs.

It has been suggested to replace the heavy liquid separation process with a two-stage process which consists of a pre-treatment of a sample of the metal powder product to enhance the separability of the metallic and contaminant constituents followed by a safe and reliable, conventional separation process. In one embodiment, the two-stage process would be heating the metal product powder to selectively enhance the magnetic susceptibility of the metal particles followed by magnetic separation.

In one embodiment of the invention non-magnetic contaminants can be separated from feebly magnetic superalloy metal powders by subjecting the mixture to high magnetic fields. In this embodiment multiple passes through the magnetic field may be employed to produce effective separation.

In a preferred embodiment of the invention, the method of separating nickel-based superalloy metal powder from non-magnetic contaminants includes heating the superalloy metal powder in air or other oxygen-containing atmosphere to convert the metallic phases to phases with enhanced magnetic properties, and thereby enhance the magnetic properties of the superalloy metal powder followed by magnetic separation of the metal powder from the contaminants.

It is preferred in order to resist undesired agglomeration of the metal powder particles through appropriate choice of heating conditions or through mechanical agitation or both to provide resistance to agglomeration among the metal powder product particles during the separability enhancement stage.

In one embodiment, the separability enhancement stage preferably occurs at a temperature in excess of 400° C. and preferably is in the range of about 500–1000° C. and more preferably about 700–900° C. The time at temperature in air depends upon the temperature with longer times such as 24 hours, for example, used for a temperature of about 500° C. and shorter times, such as one hour or less, for example, used for 900° C. The heating to resist agglomeration without mechanical agitation preferably is at about 500 to 700° C. Agglomeration is preferably minimized or prevented at essentially all temperatures by using mechanical agitation.

It is an object of the present invention to provide a reliable, safe, accurate and lower-cost method of producing aliquots from superalloy metal powders which are concentrated with respect to the non-magnetic contaminants admixed therewith.

It is another object of the present invention to provide such a method which employs enhancement of the magnetic properties of the superalloy metal powder through changes in the phases of the metallic particles to facilitate production of aliquots which are concentrated with respect to the contaminants.

It is another object of the present invention to provide means for resisting agglomeration of the metal powder product particles during alteration of the metallic phases.

It is another object of the present invention to provide means for resisting agglomeration of the metal powder product particles during formation of the metal oxide coatings thereon.

It is a further object of the present invention to provide such a system which is readily and advantageously employed in effective quality assurance processes.

It is yet another object of the present invention to provide such a method which does not require the use of highly skilled technical individuals.

It is a further object of the present invention to provide such a method which resists adding extraneous contaminants to the superalloy metal powder and contaminant mixture.

These and other objects of the invention will be more fully understood from the following detailed description of the invention on reference to the FIGURE appended hereto.

BRIEF DESCRIPTION OF THE DRAWINGS

The FIGURE is a schematic flow diagram illustrating the general process sequences of preferred practices of three embodiments of the present invention.

DESCRIPTION OF THE PREFERRED EMBODIMENTS

A preferred use of the method of the present invention is in connection with the quality assurance evaluation of nickel-based superalloy powders which may have a size on the order of less than about 60 microns, and related contaminants which may be powder-manufacturing-process-produced contaminants having a size of less than about 100 microns. In order to enhance the efficiency of quality assurance operations, it is desired to create an effective separation of the contaminants from the metal powder. Such contaminants may be present in amounts of 10 parts per million (ppm) or less.

It will be appreciated that for certain end uses of the superalloy metals, such as in aircraft engines for example, for both safety and economic reasons it is critical that the superalloy powder have the required purity with respect to even very low levels of contaminants.

In quality assurance programs employed to cull materials with unacceptably high levels of contaminants, contaminants are relatively rare events. As a result, it is desirable to produce samples for quality assurance that are concentrated with respect to such contaminants.

Among the process-produced contaminants of particular concern in the present invention are those selected from the group consisting of silicon dioxide and aluminum oxide. Among the preferred superalloy metal powders are those selected from the group consisting of non-magnetic superalloys, including nickel-containing alloys.

The FIGURE illustrates three preferred embodiments of the present invention which are shown as three paths to obtaining magnetic separation of the superalloy metal-powder-contaminant mixture.

The first path 20 involves magnetic separation of the as-received alloy powder which because of its relatively low magnetic properties results in magnetic separation at lesser level of effectiveness than the second and third paths 30 and 40.

In the embodiment 20 of path 1 superalloy metal powder product containing non-magnetic contaminants 50 are passed through a magnetic field 60 (which preferably has a large magnetic field which is greater than 24,000 gauss) followed by retrieval of the non-magnetic contaminants in a partially concentrated aliquot. The powder product 50 may be passed through the magnetic field 60 two or more times to enhance separation efficiency.

The second path 30 involves heat treating the metal powder product at relatively low temperatures (which may be 500 to 700° C. for about 2 to 24 hours 64 in air or other oxidizing atmosphere) to enhance the magnetic properties. The powder is then cooled or permitted to cool to room temperature 66. After that, the powder is passed through a magnetic field 60 to permit retrieval of the non-magnetic contaminants in a concentrated aliquot. Under these conditions magnetic separation is achieved at a higher level than through the embodiment of path 20 without employing as large a magnetic field or repeated cycles of operation, although such approaches may be employed, if desired. The heating process produces a metal oxide coating on the surface of the superalloy powder.

The embodiment of the third path 40 involves heat treating 70 the powder at relatively high temperatures which may be about 800 to 1000° C. for about ½ to 2 hours to achieve high magnetic properties. Times at temperature can range from about five minutes to two hours depending upon the temperature, with longer time being employed for the lower temperatures. The treated powder is then cooled or permitted to cool 74 to room temperature followed by magnetic separation 60 and retrieval of non-magnetic contaminants in a concentrated aliquot. This produces a relatively thick metal oxide coating on the superalloy metal powder to enhance magnetic properties.

The process of heating is conducted in an oxidizing environment such as air. As the contaminants are oxides, they are not altered by the thermal process which enhances the superalloy metal powder magnetic properties.

To resist undesirable agglomeration of the metal powders, heating preferably may be effected for periods of about 3 to 15 minutes alternating with mechanical agitation which may be effected by a suitable means well known to those skilled in the art. In the alternative, heating and mechanical agitation may be effected simultaneously. One method of mechanical agitation can involve vibrating the powder container while in the furnace at a predetermined temperature at a suitable frequency to obtain a fluid-type motion of the powder.

For all three embodiments 20, 30, 40, the metal powder product may then be subjected to magnetic separation of the magnetically more susceptible metal particles by any suitable means, such as, transporting the powder through a magnetic field. In this manner, the contaminants such as process-produced contaminants will have increased concentration resulting from separation of the superalloy metal powder.

While certain preferred methods of enhancing magnetic properties have been disclosed in connection with the embodiments of paths 30 and 40, it will be appreciated that effective magnetic enhancement may be accomplished in these embodiments within the range of about 400 to 1000°

C. and preferably about 500 to 1000° C. for about ½ to 24 hours with shorter time periods being required for higher temperatures.

In order to provide additional understanding of the invention, several examples will be considered.

EXAMPLE 1

A superalloy metal powder with a nominal composition of 14% Cr, 8% Co, 3.5% Mo, 3.5% W, <3.5% Nb, 3.5% Ti, 3.5% Al, and balance Ni, and a particle size of −270 mesh was heated in air at a temperature of 900° C. for a total of one hour and cooled to room temperature. During heat treatment, the powder was removed from the furnace every 15 minutes and agitated (stirred) to resist agglomeration. Magnetic measurements of the powder showed that it was weakly paramagnetic before heat treatment, but was ferromagnetic after the heat treatment. The powder was passed through a belt-type magnetic separator employing a field strength of 24,000 gauss and because of the substantially enhanced magnetic properties of the metal alloy powder, the non-magnetic contaminants were readily separated therefrom.

Separation efficiency was excellent at a level exceeding 90% with only one pass through the separator.

EXAMPLE 2

Metal powder with the characteristics of the powder of Example 1 and in the non-heat-treated condition was passed through the belt magnetic separator with the aforementioned high-field strength of 24,000 gauss. The metallic particles in the as-received metal powder product are only feebly magnetic. While one pass through the separator resulted in some separation of the non-magnetic contaminants from the alloy powder, separation efficiency was about 30%. Multiple passes through the separator would be required to increase the efficiency to acceptable levels.

EXAMPLE 3

Metal powder with the characteristics of the powder of Example 1 was heated in air for 24 hours at 500° C. and another batch for two hours at 600° C. Magnetic measurements showed that both powders had become moderately paramagnetic. Furthermore, at these temperatures and times essentially no agglomeration of the powder was observed. Heat treatment at these relatively low temperatures could be used to obtain magnetic separation efficiencies substantially higher than that for as-produced powder of path 20.

The magnetic properties of the metal particles may be enhanced by altering the composition of one or more regions within the metal particles.

It is believed that enhanced magnetic properties may be effected in superalloy metal powder by removing chromium from the metal matrix as by oxide formation or leaching, for example. Also, phase transformation may be employed to enhance magnetic properties.

It will be appreciated that the present invention has provided a safe, enhanced reliable method of effecting separation of contaminates such as process-produced contaminants from superalloy metal powders through enhancing the magnetic susceptibility of the metallic particles and thereby facilitating magnetic separation thereof.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limited as to the scope of the invention which is to be given the full breadth of the appended claims and any and all equivalents thereof.

We claim:

1. A method of separating superalloy metal powder from non-magnetic contaminants admixed therewith comprising,
   enhancing the magnetic response of such superalloy metal powder while maintaining said superalloy in a solid state, and
   magnetically separating said metal powder from said contaminants.

2. The method of claim 1, including
   employing heating as the means of enhancing the magnetic response of the metal powder.

3. The method of claim 2, including
   effecting said heating in an oxidizing atmosphere.

4. A method of separating supperalloy metal powder from non-magnetic contaminants admixed therewith comprising
   enhancing the magnetic response of such superalloy metal powder,
   magnetically separating said metal powder from said contaminant,
   employing heating as the means of enhancing the magnetic response of the metal powder,
   effecting said heating in an oxidizing atmosphere, and
   said heating producing an oxide layer on the metallic particles.

5. The method of claim 1, wherein
   said means of enhancing the magnetic response on the metal powder includes altering the phases of the metallic particles.

6. The method of claim 1, wherein
   said means of enhancing the magnetic response on the metal powder including altering the composition of one or more regions within the metal particles.

7. A method of separating superalloy metal powder from non-magnetic contaminants admixed therewith comprising,
   enhancing the magnetic response of such superalloy metal powder,
   magnetically separating said metal powder from said contaminant,
   employing heating as the means of enhancing the magnetic response of the metal powder, and
   resisting agglomeration of said metal powder and contaminant particles during heating and prior to said magnetic separation of the admixture.

8. The method of claim 7, including
   resisting agglomeration by agitating said metal powder and contaminant.

9. The method of claim 7, including
   resisting agglomerating by a combination of predetermined time, temperature and furnace atmosphere conditions.

10. The method of claim 7, including
    resisting agglomeration of said metal powder by both heating and mechanical agitation.

11. A method of separating superalloy metal powder from non-magnetic contaminants admixed therewith comprising,
    enhancing the magnetic response of such superalloy metal powder,
    magnetically separating said metal powder from said contaminant,
    employing heating as the means of enhancing the magnetic response of the metal powder, and effecting said heating to resist said agglomeration at a temperature of about 500 to 700° C. for a period of about 2 to 24 hours.

12. The method of claim 4, including
effecting said heating to create said metal oxide coating in an oxidizing atmosphere at temperature greater than 500° C.

13. A method of separating superalloy metal powder from non-magnetic contaminants admixed therewith comprising,
enhancing the magnetic response of such superalloy metal powder,
magnetically separating said metal powder from said contaminant,
employing heating as the means of enhancing the magnetic response of the metal powder, and
effecting said heating to create a metal oxide coating in an oxidizing atmosphere.

14. The method of claim 13, including
employing argon in said oxidizing atmosphere.

15. The method of claim 12, including
effecting said heating to create said metal oxide coating at about 800 to 1000° C.

16. The method of claim 15, including
effecting said heating for about ½ to 2 hours to create said metal oxide coating.

17. The method of claim 12, including
effecting said heating to create said metal oxide coating at a temperature of about 400 to 1000° C.

18. A method of separating superalloy metal powder from non-magnetic contaminants admixed therewith comprising,
enhancing the magnetic response of such superalloy metal powder,
magnetically separating said metal powder from said contaminant, and
employing said method on said contaminants which are process-produced contaminants.

19. The method of claim 18, including
said process-produced contaminants including at least one material selected from the group consisting of silicon dioxide and aluminum oxide.

20. The method of claim 1, including
said contaminants having a particle size less than about 100 microns.

21. A method of separating superalloy metal powder from non-magnetic contaminants admixed therewith comprising,
enhancing the magnetic response of such superalloy metal powder,
magnetically separating said metal powder from said contaminant, and
said metal powder having a particle size of less than about 60 microns,.

22. The method of claim 1, including
said contaminants having a size less than about 100 microns and a concentration of 10 ppm or less.

23. The method of claim 1, including
employing a superalloy which is a nickel-based superalloy.

24. A method of separating superalloy metal powder from non-magnetic contaminants admixed therewith comprising,
enhancing the magnetic response of such superalloy metal powder,
magnetically separating said metal powder from said contaminant, and
employing said process as part of a quality assurance process.

25. The method of claim 24, including
employing said process to produce aliquots of metal powder products which are concentrated with respect to said contaminants.

26. The method of claim 17, including
effecting said heating to produce said oxide coating at a temperature of about 500 to 700° C.

27. The method of claim 7, including
employing said process to produce aliquots of metal powder products which are concentrated with respect to contaminants.

28. A method of separating superalloy metal powder from non-magnetic contaminants admixed therewith comprising,
enhancing the magnetic response of such superalloy metal powder,
magnetically separating said metal powder from said contaminant, and
enhancing said magnetic response of said metal powder by employing a high magnetic field.

29. The method of claim 28, including
employing a said magnetic field which is at least 24,000 gauss.

30. The method of claim 28, including
repeating said method for a plurality of cycles on a batch of said superalloy metal powder.

31. The method of claim 3, including
effecting said enhancement by removing chromium from the matrix of said superalloy metal powder and
forming an oxide on said powder.

32. A method of separating superalloy metal powder from non-magnetic contaminants admixed therewith comprising,
enhancing the magnetic response of such superalloy metal powder,
magnetically separating said metal powder from said contaminant,
employing heating as the means of enhancing the magnetic response of the metal powder, and
effecting said heating at about 500 to 1000° C. for about ½ to 24 hours.

33. The method of claim 32, including
effecting said heating at about 500 to 700° C. for about 2 to 24 hours.

34. The method of claim 32, including
effecting said heating at about 800 to 900° C. for about ½ to 2 hours.

* * * * *